(12) United States Patent
Vanderzweep et al.

(10) Patent No.: US 7,958,137 B2
(45) Date of Patent: Jun. 7, 2011

(54) METHOD TO ASSIST USER IN CREATION OF HIGHLY INTER-RELATED MODELS IN COMPLEX DATABASES

(75) Inventors: Jeff Vanderzweep, Peoria, AZ (US); Tim Felke, Glendale, AZ (US); Kang Zhang, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 377 days.

(21) Appl. No.: 12/365,085

(22) Filed: Feb. 3, 2009

(65) Prior Publication Data

US 2010/0198856 A1 Aug. 5, 2010

(51) Int. Cl.
G06F 7/00 (2006.01)
(52) U.S. Cl. ...................................... 707/763
(58) Field of Classification Search .................. 707/706, 707/723, 754, 763
See application file for complete search history.

(56) References Cited

U.S. PATENT DOCUMENTS

| | | | |
|---|---|---|---|
| 5,584,024 A | 12/1996 | Shwartz | |
| 6,028,605 A | 2/2000 | Conrad et al. | |
| 6,662,089 B2 | 12/2003 | Felke et al. | |
| 6,748,304 B2 | 6/2004 | Felke et al. | |
| 6,795,820 B2 | 9/2004 | Barnett | |
| 6,829,527 B2 | 12/2004 | Felke et al. | |
| 6,907,422 B1 | 6/2005 | Predovic | |
| 7,287,012 B2 | 10/2007 | Corston et al. | |
| 7,373,225 B1 | 5/2008 | Grier et al. | |
| 2007/0038616 A1 | 2/2007 | Guha | |
| 2007/0255755 A1 | 11/2007 | Zhang et al. | |
| 2008/0208882 A1 | 8/2008 | Zhang et al. | |

FOREIGN PATENT DOCUMENTS

WO 2008063818 5/2008

OTHER PUBLICATIONS

BT Wholesale, "User Guide for Fault Diagnostics", Jan. 29, 2007, pp. 7-14.
Nordstrom, "Moving to XML At Volvo Cars", May 20, 2002, pp. 21-26, Publisher: Aerotech Telub Information & Media AB, Published in: Spain.

*Primary Examiner* — Pierre M Vital
*Assistant Examiner* — Truong V Vo
(74) *Attorney, Agent, or Firm* — Fogg & Powers LLC

(57) ABSTRACT

A computer-implemented method is provided to facilitate creation of linked inter-related models in a database. The method comprises obtaining a search text and match criteria from a user, and determining whether a prequery exists. If not, a list of all destination items is obtained. If yes, a determination is made whether the prequery is enabled. If not, a list of all destination items is obtained. If enabled, a list of all destination items limited by the prequery is obtained. A determination is then made whether all match criteria is selected. If yes, all items in the destination list are returned to the user. If not, a word list is generated by parsing all words from the search text. All valid synonyms are added for each word in the word list. The items in the destination list are reduced to items that match at least one word in the word list. A determination is made whether one or more additional filters exist. If not, a reduced list filtered by the match criteria is returned to the user. If the additional filters exist, the filters are presented to the user. The matched item list is then reduced based on criteria of the filters. The reduced matched item list is then returned to the user.

20 Claims, 3 Drawing Sheets

METHOD TO ASSIST USER IN CREATION OF HIGHLY INTER-RELATED MODELS IN COMPLEX DATABASES

BACKGROUND

In the creation of large complex documents and databases, it is commonplace to require that the user create a link between one entity in a model and another entity. In most cases, this linkage has a semantic value such as implemented by, verified by, contains, specializes, and the like. Creation and management of these links is time consuming and error prone without sophisticated tools to allow the user to search for the item they wish to use in the link.

In large, complex systems, providing link creation functionality with only a search mechanism provides too much data for the end user to sift through to find their desired item. This is particularly true in systems with numerous similar items that differ only by their relations to other items. Thus, it would be beneficial to be able to further reduce a selection list based on data that is calculated to be more specific to the system of a user, to decrease the time it takes to model the data of the user.

SUMMARY

The present invention relates to a computer-implemented method to facilitate creation of linked inter-related models in a database. The method comprises obtaining a search text and match criteria from a user, and determining whether a prequery function exists. If not, a list of all destination items is obtained. If the prequery function does exist, a determination is made whether the prequery function is enabled. If not, a list of all destination items is obtained. If the prequery function is enabled, a list of all destination items limited by the prequery function is obtained. A determination is then made whether all the match criteria is selected. If yes, all items in the destination list are returned to the user. If not, a word list is generated by parsing all words from the search text. All valid synonyms are then added for each word in the word list. The items in the destination list are then reduced to items that match at least one word in the word list. A determination is made whether one or more additional filters exist. If not, the reduced list filtered by the match criteria is returned to the user. If the additional filters exist, the filters are presented to the user. The matched item list is then reduced based on criteria of the filters. The reduced matched item list is then returned to the user.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
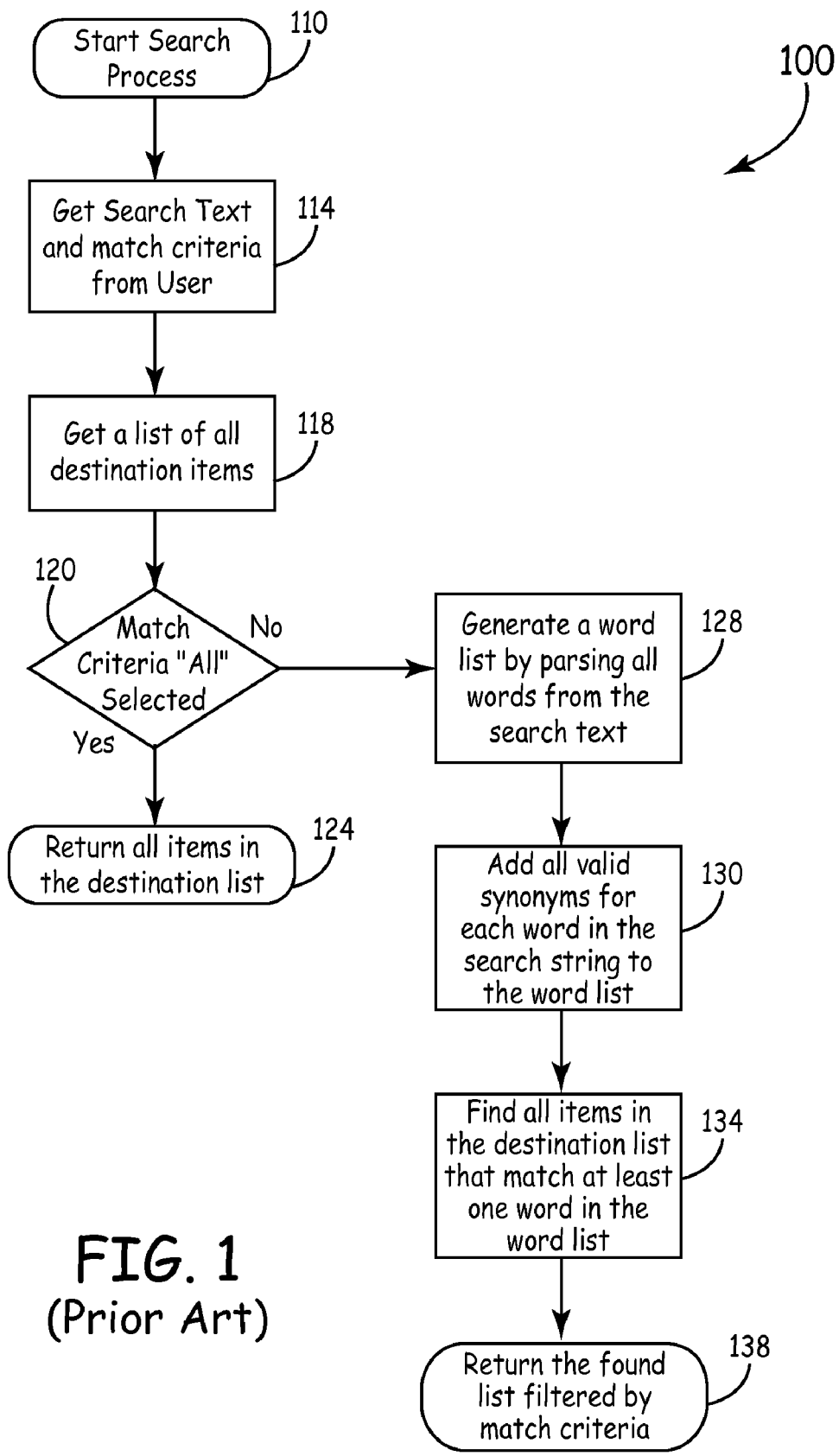
FIG. 1 is a flow diagram representing a conventional method for creation of linked inter-related models in a database.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method to assist a user in the creation of complex highly inter-related models through an intelligent link editor. The present method is particularly useful as a software tool for working with large, complex databases. The method allows metadata driven selection criteria to be specified on each relationship that a privileged user can populate. The criteria specifies the logic used to query the database to find the complete list of all legal destination items that should be presented to the user when editing a specific link type from a specific source item. The method also allows the user to specify additional filtering and sorting criteria that are used to further narrow the lists of candidate destination items that are presented.

In the present method, relationships can be established among various entity types, such as failure modes, monitors, line replaceable units (LRUs), and the like, including both hardware and software applications. An LRU is a complex component of an airplane, ship, spacecraft, automobile, or the like, which is designed to be replaced easily and quickly at the organizational level (e.g., at airport ramp area). An LRU can be a black box (sealed unit), such as a radio or other auxiliary equipment.

As there are literally tens of thousands of parameters on each LRU, some of the parameters are related to each other and some are not. In order to make it easier for a user such as an engineer to set up relationships with the present software tool, whenever a source is selected, the list of possible targets only contains those targets that make sense for the relationship based upon many different criteria, such as properties of an LRU. Both prequery and filtering techniques are utilized in the present method to achieve this objective, or to limit the number of targets to a manageable set.

The present approach does not require any code change to the software tool if some criteria has changed and has impact on the relationship between a source and target. In addition, all of the criteria can be dynamically updated in the database. The prequery information is added to each link that requires filtering. The prequery metadata looks for instances of the destination of given relationships that are related to the current source of the relationship via additional distinct paths and/or other limiting factors.

The present invention is described in further detail hereafter by referring to the drawings.

FIG. 1 is a flow diagram representing a prior method 100 for creation of linked inter-related models in a database. In method 100, a search process is started by a user at block 110. The search text and match criteria are obtained from a user input (block 114). A list of all destination items is then obtained (block 118). A determination is made whether the match criteria "All" is selected (block 120). If yes, all items in the destination list are returned to the user (block 124) and the search is complete. If not, a word list is generated by parsing all words from the search text (block 128). All valid synonyms for each word in the search string are then added to the word list (block 130). All items in the destination list that match at least one word in the word list are then found (block 134). A found list filtered by the match criteria is then returned to the user (block 138).

Figure 2:
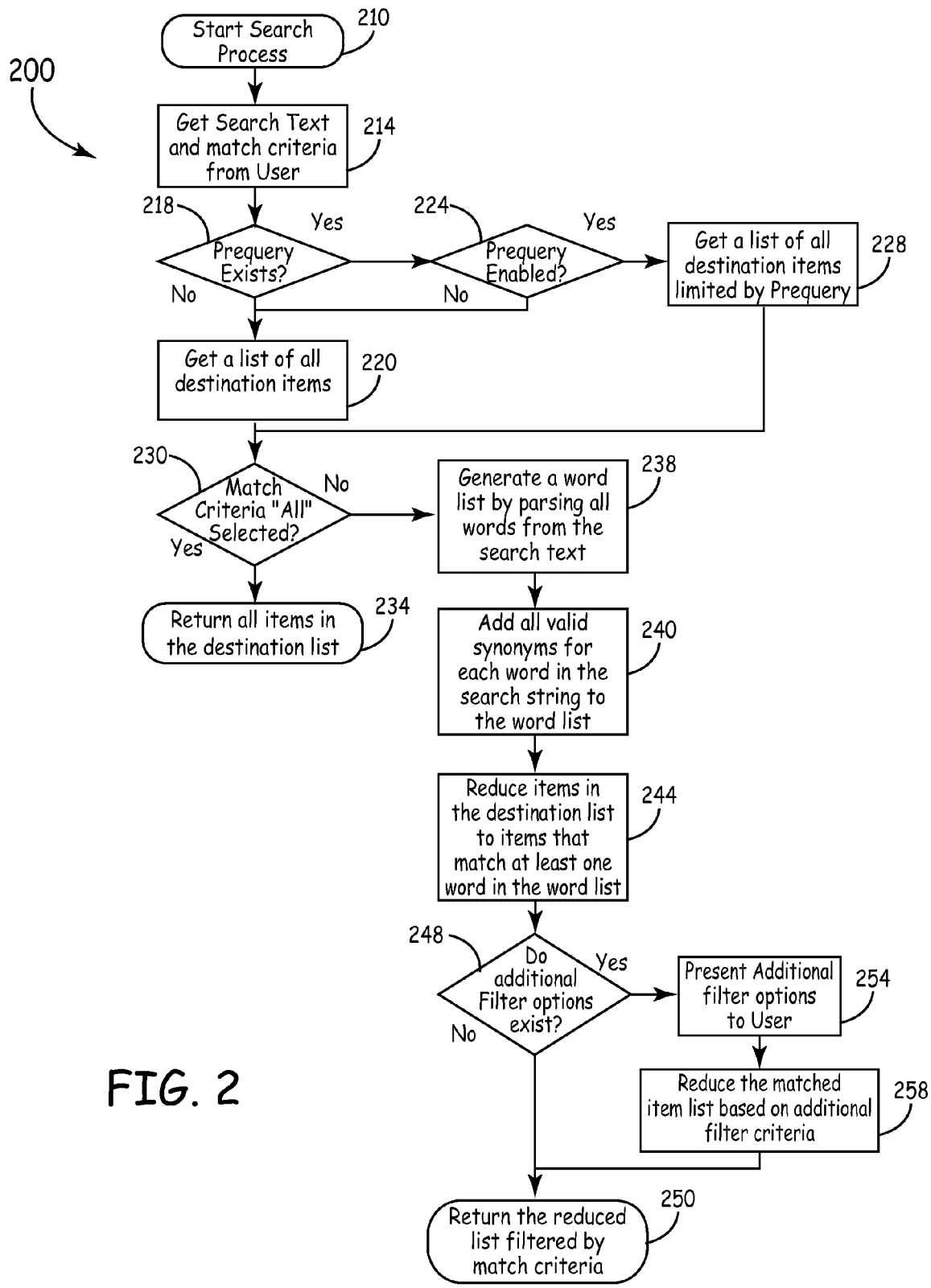
FIG. 2 is a flow diagram representing a method for creation of linked inter-related models in a database according to the present invention.

FIG. 2 is a flow diagram representing a method 200 for creation of linked inter-related models in a database according to the present invention. While method 200 includes some of the same steps as method 100, the method 200 includes additional steps that significantly enhance performance. These include both a prequery functionality and additional filter functionality, which are discussed in further detail hereafter.

In method 200, a search process is started by a user at 210. The search text and match criteria are obtained from an input by the user (block 214), and a determination is made whether a prequery function exists (block 218). If not, a list of all destination items is then obtained (block 220). If yes, a determination is made whether the prequery function is enabled (block 224). If not, a list of all destination items is obtained (block 220). If the prequery function is enabled, a list of all destination items limited by the prequery function is obtained (block 228).

A determination is then made whether the match criteria "All" has been selected (block 230). If yes, all items in the destination list are returned to the user (block 234) and the search is complete. If not, a word list is generated by parsing all words from the search text (block 238). All valid synonyms for each word in the search string are then added to the word list (block 240). The items in the destination list are then reduced to items that match at least one word in the word list (block 244).

A determination is then made whether additional filter options exist (block 248). If not, a reduced list filtered by the match criteria is returned to the user (block 250). If additional filter options do exist, the filter options are presented to the user (block 254). The matched item list is reduced based on the additional filter criteria (block 258). The reduced list filtered by the match criteria is then returned to the user (block 250).

The prequery function in the present method is an administrator defined filter on a given relationship. Each relationship between a source entity and destination entity can have both an optional forward prequery and an optional reverse prequery defined. Either the forward or reverse prequery can be used, depending if the user is trying to create the relationship from the source entity type to the destination entity type or from the destination entity type to the source entity type. The administrator user creates the prequery as a standard SQL (Structured Query Language) query, which can include any number of tables and criteria.

The prequery must return only items from the ultimate entity type for which the search is being conducted. The prequery can used to limit the entity selection list by items that share additional commonalities with the entity that the search is initiated from, such as limiting to items that share a relationship to an additional entity or entities, or to entities that have certain values set on them.

The additional filter functionality that can be employed in the present method is added to entity types to allow the user to reduce search lists by selecting a value. The additional filters are metadata driven and defined against one or more attributes on an entity type. When a search is being performed, the initial list of items is presented to the user, and each filter attribute gets a selection box populated in the search tool, such as a drop down box. The filter selection boxes are populated with a distinct list of the values in the attribute associated with the filter. The user can select a value from each or any filter box and specify for each one whether the result list should be restricted to rows that match the value with the associated attribute or that do not match the selected value. The administrator user can specify a filter against any attribute on each entity, though they are typically limited to attributes that have a small set of distinct values that can be specified on a given attribute.

Figure 3:
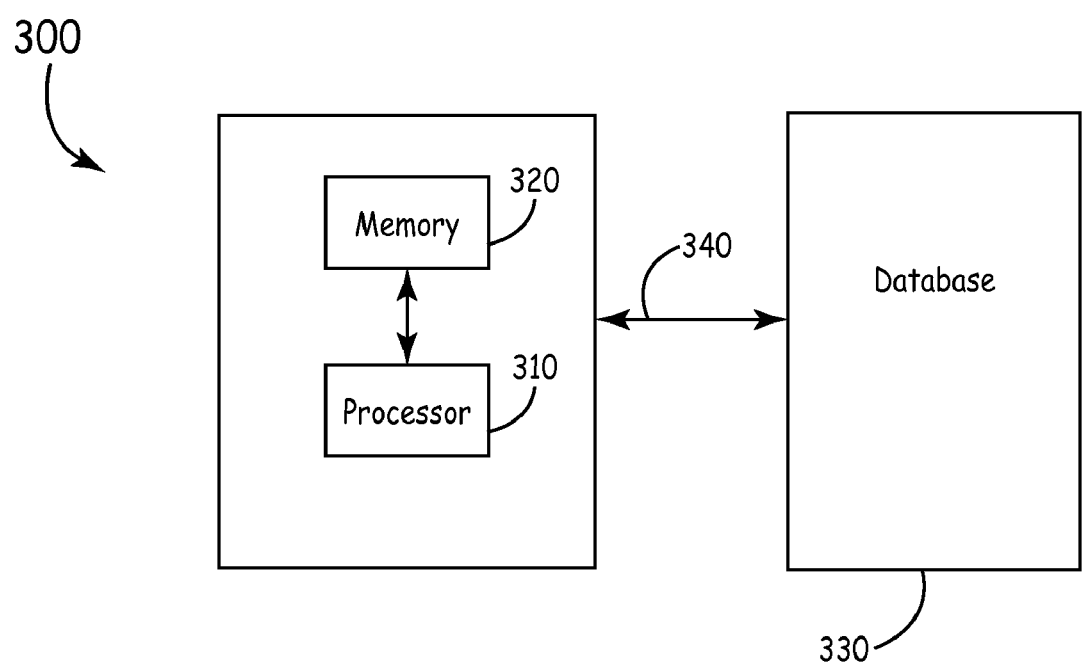
FIG. 3 is a block diagram of a computer system that can implement the method of the invention.

FIG. 3 is a block diagram of one embodiment of a computer system 300 that can implement the method of the invention. The computer system 300 generally includes at least one processor 310, and at least one memory device 320 in operative communication with processor 310. The computer system 300 communicates with one or more databases 330 through a wired or wireless connection 340 as known to those skilled in the art.

The processor 310 can be implemented using software, firmware, hardware, or any appropriate combination thereof, as known to one of skill in the art. By way of example and not limitation, hardware components for processor 310 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, processor 310 includes or functions with software programs, firmware, or other computer readable instructions for carrying out various process tasks, calculations, and control functions, used in the present method. These instructions are typically tangibly embodied on any appropriate medium used for storage of computer readable instructions or data structures.

The memory device 320 can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, and the like. Suitable computer readable media may also include transmission media such as electrical, electromagnetic, or digital signals, conveyed via a communication medium such as a network and/or a wireless link. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of program code means for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A computer-implemented method to facilitate creation of linked inter-related models in a database, the method comprising:
   obtaining a search text and match criteria from a user;
   determining whether a prequery function exists;
   if the prequery function does not exist, obtaining a list of all destination items;
   if the prequery function does exist, determining whether the prequery function is enabled;
      if the prequery function is not enabled, obtaining a list of all destination items;
      if the prequery function is enabled, obtaining a list of all destination items limited by the prequery function;
   determining whether all the match criteria has been selected;
   if all the match criteria has been selected, returning all items in the destination list to the user;
   if all the match criteria has not been selected,
      generating a word list by parsing all words from the search text;
      adding all valid synonyms for each word in a search string to the word list;
      reducing the items in the destination list to items in a reduced list that match at least one word in the word list;
      determining whether one or more additional filters exist;
      if the one or more additional filters do not exist, returning the reduced list filtered by the match criteria to the user;
      if the one or more additional filters exist,
         presenting the one or more additional filters to the user;
         reducing the matched item list based on criteria of the one or more additional filters; and
         returning the reduced matched item list to the user.

2. The method of claim 1, wherein the prequery function is metadata driven.

3. The method of claim 1, wherein the prequery function comprises an administrator defined filter on a given relationship.

4. The method of claim 3, wherein the relationship comprises a link between a source entity and a destination entity.

5. The method of claim 4, wherein the relationship between the source entity and the destination entity comprises a forward prequery or a reverse prequery.

6. The method of claim 5, wherein the forward prequery is from the source entity to the destination entity.

7. The method of claim 5, wherein the reverse prequery is from the destination entity to the source entity.

8. The method of claim 3, wherein the relationship comprises one or more links between a plurality of line-replaceable units.

9. The method of claim 1, further comprising dynamically updating all criteria in the database.

10. The method of claim 1, further comprising adding prequery information to each link that requires filtering.

11. The method of claim 1, wherein the prequery function comprises a structured query language (SQL) query.

12. The method of claim 1, wherein the additional filters allow the user to reduce a search list by selecting a value.

13. The method of claim 1, wherein the additional filters are metadata driven.

14. The method of claim 1, wherein the additional filters are defined against one or more filter attributes on an entity type.

15. The method of claim 14, wherein the filter attributes each have a filter selection box.

16. The method of claim 15, wherein each filter selection box is populated with a distinct list of values associated with the filter attributes.

17. A computer program product, comprising:
   A non-transitory computer readable medium having program instructions stored thereon for a method to facilitate creation of linked inter-related models in a database according to claim 1.

18. The computer program product of claim 17, wherein the prequery function and the additional filters are metadata driven.

19. A computer system, comprising:
   at least one processor; and
   at least one memory device in operative communication with the processor, the memory device having program instructions stored thereon, executable by the processor, for a method to facilitate creation of linked inter-related models in a database according to claim 1.

20. The computer system of claim 19, wherein the prequery function and the additional filters are metadata driven.

* * * * *